United States Patent
Nakajima (10) Patent No.: US 9,946,208 B2
(45) Date of Patent: Apr. 17, 2018

(54) IMAGE FORMING APPARATUS AND METHOD FOR CONTROLLING IMAGE FORMING APPARATUS

(71) Applicant: KYOCERA Document Solutions Inc., Osaka (JP)

(72) Inventor: Yoshimasa Nakajima, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/670,763

(22) Filed: Aug. 7, 2017

(65) Prior Publication Data

US 2018/0059604 A1 Mar. 1, 2018

(30) Foreign Application Priority Data

Aug. 31, 2016 (JP) .................. 2016-169743

(51) Int. Cl.
| | |
|---|---|
| G06K 15/00 | (2006.01) |
| G03G 15/00 | (2006.01) |
| H04W 52/02 | (2009.01) |
| G03G 15/20 | (2006.01) |
| B41J 13/00 | (2006.01) |
| G06F 3/0488 | (2013.01) |
| H04N 1/00 | (2006.01) |

(52) U.S. Cl.
CPC ........... G03G 15/553 (2013.01); G03G 15/80 (2013.01); H04W 52/0212 (2013.01); B41J 13/0018 (2013.01); G03G 15/2039 (2013.01); G06F 3/0488 (2013.01); H04N 1/00037 (2013.01)

(58) Field of Classification Search
CPC .. G03G 15/553; G03G 15/80; G03G 15/2039; H04W 52/0212; B41J 13/0018; G06F 3/0488; H04N 1/00037
USPC ........................................................ 358/1.14
See application file for complete search history.

(56) References Cited

U.S. PATENT DOCUMENTS

| | | | | |
|---|---|---|---|---|
| 8,599,412 | B2* | 12/2013 | Narushima | ........... G06F 1/3284 358/1.15 |
| 9,491,322 | B2* | 11/2016 | Baba | .................. H04N 1/00037 |
| 9,678,700 | B2* | 6/2017 | Goto | ....................... G06F 3/121 |

FOREIGN PATENT DOCUMENTS

JP 2009-131984 A 6/2009

* cited by examiner

*Primary Examiner* — Neil R McLean
(74) *Attorney, Agent, or Firm* — Stein IP, LLC (57) ABSTRACT

When performing a specific process accompanied with reading or writing a storage unit in a sleep mode, the power supply control unit control a control unit and the storage unit to temporarily return. When detecting movement in a period from start to end of the temporary return, the power supply control unit restarts power supply to a display panel. The control unit controls to display warning informing that the storage unit is working and urging to be careful so that the power is not disconnected.

8 Claims, 5 Drawing Sheets

IMAGE FORMING APPARATUS AND METHOD FOR CONTROLLING IMAGE FORMING APPARATUS

INCORPORATION BY REFERENCE

This application is based upon and claims the benefit of priority from the corresponding Japanese Patent Application No. 2016-169743 filed Aug. 31, 2016, the entire contents of which are hereby incorporated by reference.

BACKGROUND

The present disclosure relates to an image forming apparatus equipped with a storage unit such as a hard disk drive (HDD) or a solid state drive (SSD).

In an office such as a company office, a hospital office, and a government office, a printing device and PCs are usually connected to a network. The printing device may be moved to another place for various circumstances such as rearrangement or change of organization. Here, when the network connecting the printing device is not changed before and after the movement, a user in a department before the movement may misprint by a printing device after the movement. The user who misprinted may look for the printing device that printed his or her printed matter. Further, the user may go and take the printed matter. This is bothering. In addition, a person who doesn't have a right to view may view the printed matter. Concerning these problems when the printing device is moved, the following technique is known.

a printing device is known that includes a storage battery for supplying power, forms characters and the like based on print data on a recording medium, detects acceleration of the printing device, determines whether or not the printing device is moved based on the detected acceleration, and does not perform printing of characters and images based on print data on the recording medium when it is determined that the printing device is moved. By the storage battery, even in a case where the printing device is not powered on, acceleration of the printing device is detected, and it is detected that installation place of the printing device is changed, so as not to form characters and images on the recording medium based on print data.

Concerning power control, the image forming apparatus has a normal mode and a sleep mode. For example, the normal mode is a mode that enables quick start of a job. In the normal mode, power is supplied to individual portions of the image forming apparatus. In addition, the sleep mode is a mode in which power consumption of the image forming apparatus in a standby state is decreased. In the sleep mode, power supply to some portions of the image forming apparatus is stopped. For example, in the sleep mode, light emitting portions such as an LED and a display panel are turned off.

The image forming apparatus operates by power supplied from a commercial power source. Usually, a power cord is used for connecting to the commercial power source. One end of the power cord is inserted into an outlet. The other end of the power cord is connected to the image forming apparatus. When the image forming apparatus is moved, the power cord is stretched. Then, the power cord may be disconnected from the image forming apparatus or from the outlet. When the power cord is disconnected, power supply to the image forming apparatus is cut off.

The image forming apparatus in the sleep mode is in a quiet state in which light emitting portions are turned off. The image forming apparatus does not appear to operate. For this reason, a user may move the image forming apparatus in the sleep mode. However, there is an image forming apparatus that reads or writes the storage unit in an intermittent manner even in the sleep mode. The storage unit is a large capacity storage unit for storing data in a nonvolatile manner. In the sleep mode, it cannot be known externally whether or not the storage unit is being read or written.

When the image forming apparatus in the sleep mode is moved and the power cord is disconnected, the storage unit may be being read or written. There is a problem that when the power cord is disconnected during reading or writing the storage unit, data may be broken, or the storage unit itself may be broken.

Here, the conventional technique described above detects a change in the installation place of the printing device based on acceleration. Then, printing is disabled. However, it cannot support movement of the image forming apparatus in the sleep mode, disconnect of the power cord, and breakdown of data or the storage unit. Therefore, it cannot solve the problem described above.

SUMMARY

In order to achieve the above-mentioned object, an image forming apparatus according to claim 1 includes a power supply unit, a power cord, a movement detection unit, an operation panel, a storage unit, a control unit, and a power supply control unit. The power supply unit generates a voltage based on a power supplied from a commercial power source. The power cord is inserted to the image forming apparatus so as to connect the power supply unit and the commercial power source. The movement detection unit includes an acceleration detection unit having an acceleration sensor and detects movement of the image forming apparatus based on an output of the acceleration sensor. The operation panel includes a display panel. The storage unit stores data. The control unit controls the storage unit to read data and to write data. When a predetermined transition condition is satisfied, the power supply control unit stops power supply to predetermined supply stop portions including the display panel, the storage unit, and the control unit so that the image forming apparatus becomes a sleep mode. When a predetermined return condition is satisfied in the sleep mode, the power supply control unit restarts power supply to the supply stop portions so that the image forming apparatus becomes a normal mode. In the sleep mode, when the control unit performs a predetermined specific process accompanied with reading or writing the storage unit, the power supply control unit temporarily restarts power supply to the control unit and the storage unit for temporary return. After the specific process, the power supply control unit stops power supply to the control unit and the storage unit so as to finish the temporary return. The control unit controls the storage unit to perform an interception preprocess for protecting stored data before the temporary return is finished. When the movement detection unit detects movement in a period from start to end of the temporary return, the power supply control unit restarts power supply to the display panel, and the control unit controls the display panel to display a message warning informing that the storage unit is working and urging to be careful so that the power is not disconnected.

Further features and advantages of the present invention will become apparent from the description of embodiments given below.

DETAILED DESCRIPTION

The present disclosure is aimed at preventing breakdown of data or a storage unit due to a movement of the image forming apparatus and disconnection of a power cord in a sleep mode thereof. Hereinafter, embodiments of the present disclosure are described with reference to FIGS. 1 to 6. Further, in the following description, a multifunction peripheral 100 is exemplified as the image forming apparatus. However, elements such as structures and arrangements in the following description should not be interpreted as limitations but are merely examples for description.

(Outline of Image Forming Apparatus)

Figure 1:
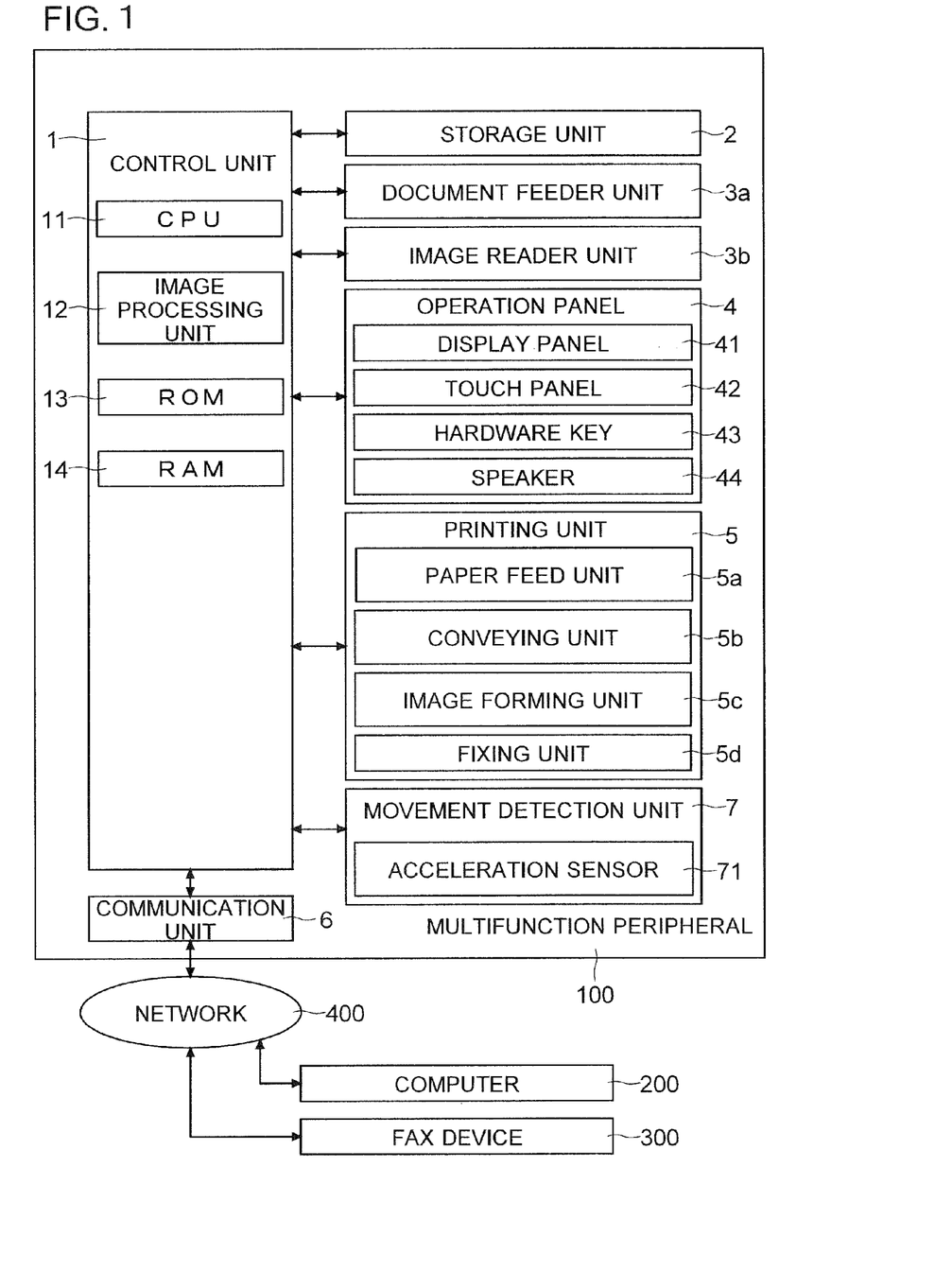
FIG. 1 is a diagram illustrating an example of a multifunction peripheral according to an embodiment.

First, with reference to FIG. 1, an outline of the multifunction peripheral 100 according to the embodiment is described. The multifunction peripheral 100 includes a control unit 1 inside. The control unit 1 is a circuit board. The control unit 1 controls individual portions of the multifunction peripheral 100. The control unit 1 includes a CPU 11, an image processing unit 12, a ROM 13, and a RAM 14. The CPU 11 performs various calculations and processes. The image processing unit 12 performs image processing on image data so as to generate image data to be used for printing or transmission. The multifunction peripheral 100 includes a storage unit 2. The storage unit 2 is a large capacity storage unit. The storage unit 2 is connected to the control unit 1 in a communicable manner. The multifunction peripheral 100 includes a nonvolatile storage unit such as the ROM 13 and the storage unit 2. In addition, the multifunction peripheral 100 includes a volatile storage unit such as the RAM 14. The CPU 11 performs calculations and processes so as to control individual portions of the multifunction peripheral 100 based on a program P1 and control data D1 stored in the ROM 13 or the storage unit 2 (see FIG. 2).

A document feeder unit 3a and an image reader unit 3b are provided to the multifunction peripheral 100. The control unit 1 controls the document feeder unit 3a to feed set document sheets one by one in a continuous and automatic manner to a reading position (feed reading contact glass, not shown). The control unit 1 controls the image reader unit 3b to read the document sheet fed by the document feeder unit 3a or a document set on a place reading contact glass (not shown). The image reader unit 3b generates image data.

The multifunction peripheral 100 has an operation panel 4. The operation panel 4 includes a display panel 41, a touch panel 42, and hardware keys 43. The display panel 41 displays setting screens for printing and scanning, and various messages. The touch panel 42 is provided to the display panel 41. The hardware keys 43 include a start key. The operation panel 4 receives setting operations of job execution conditions and set values. The job is, for example, a print job or a transmission job. The control unit 1 recognizes content of setting with the operation panel 4. In addition, a speaker 44 for producing sound is provided to the operation panel 4. The control unit 1 supplies sound waveform patterns to the speaker 44. The speaker 44 outputs sound.

A printing unit 5 is disposed in the multifunction peripheral 100. The printing unit 5 includes a paper feed unit 5a, a conveying unit 5b, an image forming unit 5c, and a fixing unit 5d. When performing printing, the control unit 1 controls the paper feed unit 5a to feed a paper sheet. The control unit 1 controls the conveying unit 5b to convey the paper sheet fed from the paper feed unit 5a. The control unit 1 controls the image forming unit 5c to form a toner image based on image data. The control unit 1 controls the image forming unit 5c to transfer the toner image to the conveyed paper sheet. The control unit 1 controls the fixing unit 5d to heat and press the paper sheet with the transferred toner image. Thus, the toner image is fixed to the paper sheet. The paper sheet after fixing is discharged to the outside of the apparatus.

The control unit 1 is connected to a communication unit 6. The communication unit 6 performs communication with a computer 200 or a FAX device 300 via a network 400. The computer 200 is, for example, a PC or a server. For example, the communication unit 6 is a circuit board (network interface card). The communication unit 6 includes a connector for communication and a chip for communication control. The communication unit 6 receives print data from the computer 200. The print data includes image data and print setting. The control unit 1 controls the printing unit 5 to perform printing based on the print data (printer function). In addition, the communication unit 6 can transmit the image data to the computer 200 or the FAX device 300 (transmission function).

(HDD 2a and SSD 2b)

Figure 2:
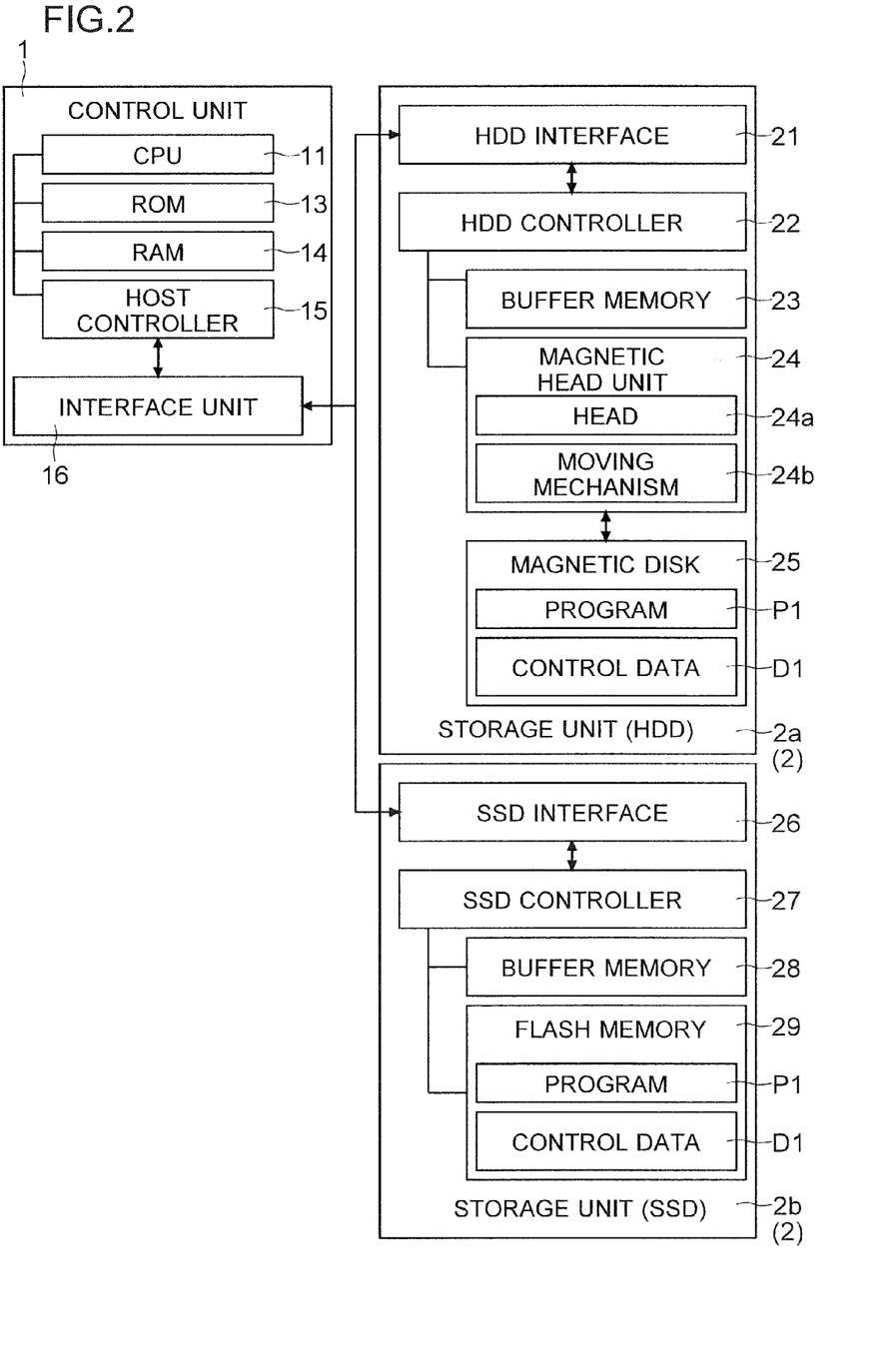
FIG. 2 is a diagram illustrating an example of a storage unit according to the embodiment.

Next, with reference to FIG. 2, an example of reading and writing the storage unit 2 according to the embodiment of the present disclosure is described. In this description, there is described an example in which the multifunction peripheral 100 includes a hard disk drive (HDD) 2a and a solid state drive (SSD) 2b as the storage unit 2 for storing data. It is possible that only one of the HDD 2a and the SSD 2b is disposed. The HDD 2a and the SSD 2b can store the program P1 and the control data D1. In addition, other data such as image data may be stored.

The HDD 2a and the SSD 2b are connected to the control unit 1 in a communicable manner. The control unit 1 is provided with a host controller 15 and an interface unit 16 for communicating data with the HDD 2a and the SSD 2b. The host controller 15 may be incorporated in the CPU 11. The interface unit 16 includes a connector. The interface unit 16 is connected to an HDD interface 21 and an SSD interface 26 via a cable.

The host controller 15 recognizes the HDD 2a and the SSD 2b connected to the interface unit 16. The host controller 15 informs the CPU 11 of a result of the recognition. The host controller 15 controls reading of data from the HDD 2a and the SSD 2b. The host controller 15 controls writing of data to the HDD 2a and the SSD 2b.

The host controller 15 reads data from the HDD 2a based on a read instruction from the CPU 11. The host controller 15 reads data from a location specified by the CPU 11. In addition, the host controller 15 controls the HDD 2a to write data based on a write instruction from the CPU 11. The host controller 15 controls to write data to a location specified by the CPU 11. The host controller 15 reads data from the SSD 2b based on a data read instruction of the SSD 2b from the CPU 11. The host controller 15 reads data from a location specified by the CPU 11. In addition, the host controller 15 controls the SSD 2b to write data based on a write instruction from the CPU 11. The host controller 15 controls to write data to a location specified by the CPU 11.

The HDD 2a includes an HDD controller 22, the HDD interface 21, a buffer memory 23, a magnetic head unit 24, and a magnetic disk 25. The magnetic head unit 24 reads and writes data from and to the magnetic disk 25. The magnetic head unit 24 includes a head 24a and a moving mechanism 24b. The head 24a faces the magnetic disk 25 so as to read and write information. The moving mechanism 24b moves (seeks) the head 24a to a position for reading or writing. Note that the HDD 2a is provided with a motor (not shown) for rotating the magnetic disk 25.

The HDD controller 22 communicates with the host controller 15. The HDD controller 22 controls all functions of the HDD 2a. The HDD controller 22 controls operations of the magnetic head unit 24 and the buffer memory 23. The HDD interface 21 receives write data. The HDD controller 22 stores received data in the buffer memory 23. The HDD controller 22 controls the magnetic head unit 24 to write the data stored in the buffer memory 23 to the magnetic disk 25. The HDD controller 22 controls the buffer memory 23 to store data read from the magnetic disk 25. Further, the HDD controller 22 transmits the read data to the control unit 1 (host controller 15) via the HDD interface 21.

The SSD 2b includes an SSD controller 27, the SSD interface 26, a buffer memory 28, and a flash memory 29. The flash memory 29 is a NAND type, for example. The flash memory 29 is actually provided with a plurality of memory chips. However, FIG. 2 illustrates only one block of the flash memory 29 for convenience sake.

The SSD controller 27 communicates with the host controller 15. The SSD controller 27 controls all functions of the SSD 2b. The SSD controller 27 controls operations of the buffer memory 28 and the flash memory 29. The SSD interface 26 receives write data from the host controller 15. The SSD controller 27 controls the buffer memory 28 to store the received data. The SSD controller 27 controls the flash memory 29 to store (write) data stored in the buffer memory 28. The SSD controller 27 controls the buffer memory 28 to store data read from the flash memory 29. The SSD controller 27 transmits the read data to the control unit 1 (host controller 15) via the SSD interface 26.

(Normal Mode and Sleep Mode)

Figure 3:
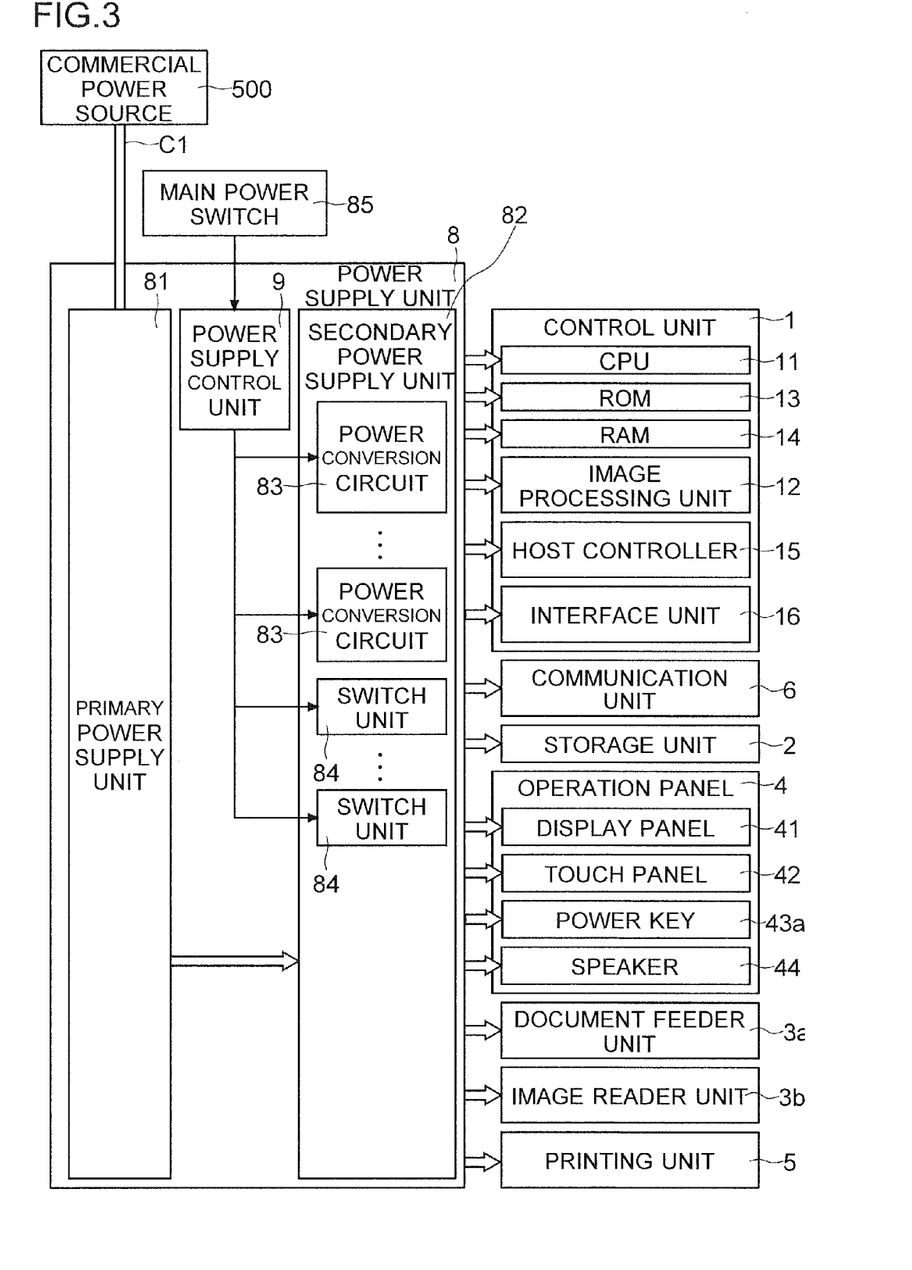
FIG. 3 is a diagram illustrating an example of a power supply system of the multifunction peripheral according to the embodiment.

Next, with reference to FIG. 3, there is described an example of modes and power supply to individual portions in the multifunction peripheral 100 according to the embodiment. The multifunction peripheral 100 includes a power supply unit 8. The power supply unit 8 includes a primary power supply unit 81, a secondary power supply unit 82, and a power supply control unit 9. A power cord C1 connects a commercial power source 500 and the multifunction peripheral 100 (the power supply unit 8, the primary power supply unit 81). The primary power supply unit 81 generates a DC voltage from the commercial power source 500 (AC voltage). The primary power supply unit 81 generates and outputs a predetermined voltage. The primary power supply unit 81 generates DC 24 V for driving motors, for example.

Various circuits and elements are disposed in the multifunction peripheral 100. Various voltages are necessary for operations of the circuits and the elements. A plurality of voltages are necessary for operations of the control unit 1, the storage unit 2, the document feeder unit 3a, the image reader unit 3b, the operation panel 4, the printing unit 5, and the communication unit 6. In addition, a plurality of voltages may be necessary for operation of a device (integrated circuit) such as the CPU 11 or the image processing unit 12. Therefore, the secondary power supply unit 82 generates a plurality of DC voltages based on the voltage generated by the primary power supply unit 81.

The secondary power supply unit 82 includes a plurality of power conversion circuits 83 for generating a plurality of voltages. The power conversion circuit 83 is a DC converter or a regulator, for example. An output voltage of each power conversion circuit 83 is predetermined. Specifically, the secondary power supply unit 82 generates and supplies voltages necessary for operations of individual portions of the control unit 1 (the CPU 11, the image processing unit 12, the ROM 13, the RAM 14, the host controller 15, and the interface unit 16), the storage unit 2 (the HDD 2a and the SSD 2b), the document feeder unit 3a (a control element and a memory in the document feeder unit 3a), the image reader unit 3b (an image sensor, a light source, a control element, and a memory in the image reader unit 3b), individual portions in the operation panel 4 (the display panel 41, the touch panel 42, and the hardware keys 43), the printing unit 5, and the communication unit 6.

The multifunction peripheral 100 has a normal mode and a sleep mode. In the normal mode, the power supply control unit 9 supplies power to all portions of the multifunction peripheral 100. The power supply control unit 9 keeps the multifunction peripheral 100 in the state in which a job can be promptly executed. For example, in order to keep the fixing unit 5d at a temperature that enables fixing, the control unit 1 controls on and off of a heater of the fixing unit 5d. However, in the normal mode, a certain amount of power is consumed in individual portions even in a state where no job is being executed (standby state).

The sleep mode is aimed at reducing power consumption of the multifunction peripheral 100. In the sleep mode, the power supply control unit 9 stops power supply to predetermined supply stop portions. The supply stop portions are some of the portions to which power is supplied in the normal mode. It can be appropriately determined which portions should be the supply stop portions.

There are the power conversion circuits 83 that supply power to both the supply stop portions and portions that are supplied with power even in the sleep mode. Switch units 84 are disposed so that only power supply to the supply stop portions can be stopped. The switch unit 84 is a switching element such as a transistor. A plurality of switch units 84 can be disposed. The switch unit 84 is disposed between the supply stop portion and the power conversion circuit 83. The power supply control unit 9 controls on and off of each of the power conversion circuits 83. The power supply control unit 9 controls on and off of each of the switch units 84.

In the multifunction peripheral 100, the control unit 1, the storage unit 2, the document feeder unit 3a, the image reader unit 3b, the display panel 41, the touch panel 42, and the printing unit 5 are set as the supply stop portions. Note that in the sleep mode, the power supply control unit 9 supplies power to a part of the control unit 1 and the storage unit 2 in an intermittent manner (details will be described later). The part of the control unit 1 includes at least the CPU 11, the RAM 14, the host controller 15, and the interface unit 16. In addition, the power supply control unit 9 supplies power to the communication unit 6 even in the sleep mode.

A main power switch 85 is disposed in the multifunction peripheral 100. The main power switch 85 is disposed on a side surface of the multifunction peripheral 100, for example. The main power switch 85 is a switch for turning on and off the main power supply. By operating the main power switch 85, the main power supply of the multifunction peripheral 100 can be turned on. When the main power supply is turned on, in order to prevent malfunction, the power supply control unit 9 starts operations of the power conversion circuits 83 at predetermined time points in a predetermined order. In addition, the power supply control unit 9 turns on the switch units 84 at predetermined time points. When the main power supply is turned on, power supply operations to the portions that are supplied with power in the normal mode are started in order. A start-up process is started in the portion to which power supply is started. When the start-up process is completed in all portions to which the power supply has been started, start-up of the multifunction peripheral 100 in the normal mode is completed.

When a transition condition to the sleep mode is satisfied during the normal mode, the multifunction peripheral 100 switches to the sleep mode. The transition condition is predetermined. The transition condition is appropriately determined. In the multifunction peripheral 100, operation of a power key 43a (one of the hardware keys 43) disposed in the operation panel 4 is regarded as the transition condition. An event that a period of time without job execution becomes longer than a predetermined reference period of time may be regarded as the transition condition. An event that a period of time without operation of the operation panel 4 becomes longer than a reference time may be regarded as the transition condition. When the transition condition is satisfied, the control unit 1 gives an instruction to the power supply control unit 9. The control unit 1 controls to stop power supply to the supply stop portions.

When switching from the normal mode to the sleep mode, the power supply control unit 9 turns off the power conversion circuits 83 and the switch units 84 for supplying power to the supply stop portions. The power supply control unit 9 turns off at predetermined time points in a predetermined order. When power supply to all the supply stop portions is stopped, transition to the sleep mode is completed.

On the other hand, when a predetermined return condition is satisfied during the sleep mode, the power supply control unit 9 controls the multifunction peripheral 100 to return to the normal mode. For example, operation of the power key 43a or reception of print data by the communication unit 6 during the sleep mode is regarded as the return condition. The power supply control unit 9 supplies power to the hardware key 43 of the operation panel 4 and the communication unit 6 even in the sleep mode. The power supply control unit 9 supplies power to a portion for detecting that the return condition is satisfied even in the sleep mode.

When returning from the sleep mode to the normal mode, the power supply control unit 9 turns on the power conversion circuits 83 and the switch units 84 for supplying power to the supply stop portions. The power supply control unit 9 turns on at predetermined time points in a predetermined order. In this way, power supply operations to the supply stop portions are sequentially restarted. A start-up process is started in the portion to which power supply is started. When the restart process is completed in all the supply stop portions, return to the normal mode is completed.

Note that when the main power supply of the multifunction peripheral 100 is turned off (when the main power switch 85 is operated), the power supply control unit 9 stops operations of the power conversion circuits 83 at predetermined time points in a predetermined order. In addition, the power supply control unit 9 turns off the switch units 84 at predetermined time points.

Here, when switching to the sleep mode or when the main power supply is turned off, power supply to the storage unit 2 is stopped. In this case, the control unit 1 controls the storage unit 2 to perform an interception preprocess. The interception preprocess is performed for protecting breakdown of data or the storage unit 2. In a case where the storage unit 2 is the HDD 2a, the control unit 1 controls the head 24a to retreat to a predetermined retreated position (an outer position of the magnetic disk 25). In this way, even if the power supply is stopped, the head 24a does not contact with the magnetic disk 25. The magnetic disk 25 is not damaged by the head 24a. In addition, reading or writing data cannot physically be performed. Breakdown of data does not occur. In a case where the storage unit 2 is the SSD 2b, the control unit 1 disables access to the flash memory 29.

(Temporary Return During Sleep Mode)

Figure 4:
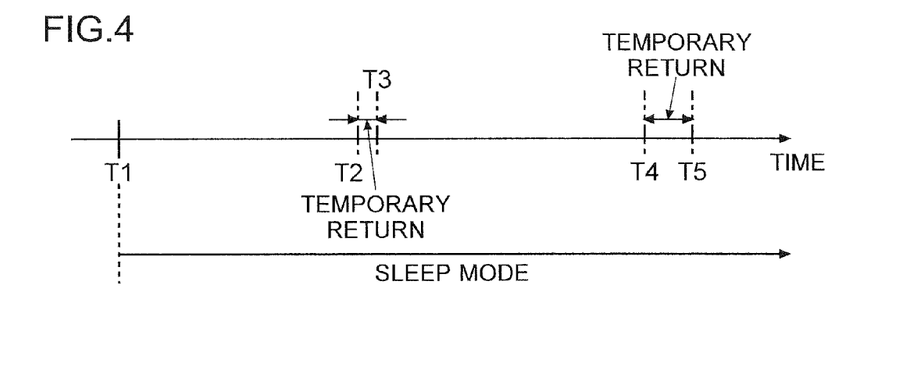
FIG. 4 is a diagram illustrating temporary return in the multifunction peripheral according to the embodiment.

Next, with reference to FIG. 4, temporary return in the multifunction peripheral 100 according to the embodiment is described. During the sleep mode, the power supply control unit 9 basically stops power supply to the control unit 1 and the storage unit 2. However, during the sleep mode, the power supply control unit 9 temporarily restarts power supply to the control unit 1 and the storage unit 2 as necessary (temporary return). Specifically, when it is necessary to perform a predetermined specific process, the power supply control unit 9 temporarily restarts power supply to the control unit 1 and the storage unit 2. The specific process is a process to be performed in the state where power supply to the control unit 1 and the storage unit 2 is stopped. In addition, the specific process is accompanied with reading and writing the storage unit 2.

A process to be the specific process is appropriately determined. Processing a large amount of data, in which the program P1 and the control data D1 are read from the storage unit 2 and are processed by the CPU 11, is set as the specific process. In the multifunction peripheral 100, a process for responding to a predetermined request from the network 400 is set as the specific process.

When receiving a request from a device connected to the network 400, it is necessary to reply a response in accordance with the protocol of the network 400. When timeout occurs without replying a response, it may be regarded that the multifunction peripheral 100 does not exist on the network 400. In addition, the multifunction peripheral 100 may not be able to receive print data from the computer 200. In addition, it may not be possible to select the multifunction peripheral 100 as a transmission destination of the print data from the computer 200.

When receiving a request that cannot be processed by the circuit scale of the communication unit 6 (the specific process) from a device connected to the network 400, the communication unit 6 issues a temporary return instruction to the power supply control unit 9. On the basis of the temporary return instruction, the power supply control unit 9 supplies power to the control unit 1 and the storage unit 2. The power supply control unit 9 causes temporary return of the control unit 1 and the storage unit 2. The temporarily returned control unit 1 reads the program P1 and the control data D1 from the storage unit 2, which are necessary for responding to the request. The control unit 1 performs a process based on the read program P1 and control data D1. The control unit 1 controls the communication unit 6 to transmit a result of the process to the network 400. Depending on the case, the control unit 1 controls the storage unit 2 to store (write) a result and a log of the process.

When the specific process is completed, the control unit 1 controls the storage unit 2 to perform the interception preprocess. In order to reduce power consumption, the control unit 1 issues to the power supply control unit 9 an instruction to stop power supply to the control unit 1 and the storage unit 2. When receiving the supply stop instruction, the power supply control unit 9 stops power supply to the control unit 1 and the storage unit 2. In this way, the temporary return is finished. For example, the temporary return is performed every ten and a few seconds to a few tens of seconds. A time period of the temporary return depends on content of the specific process. For example, the time period of the temporary return is approximately one to a few seconds.

The horizontal axis in FIG. 4 represents time. Time point T1 indicates the time point when the sleep mode is started. Time points T2 and T4 indicate examples of the time point when the power supply control unit 9 restarts power supply to the control unit 1 and the storage unit 2 for the temporary return. The time points T3 and T5 indicate examples of the time point when the power supply to the control unit 1 and the storage unit 2 is stopped after the specific process is performed (when the temporary return is finished).

(Movement Detection Unit 7)

Figure 5:
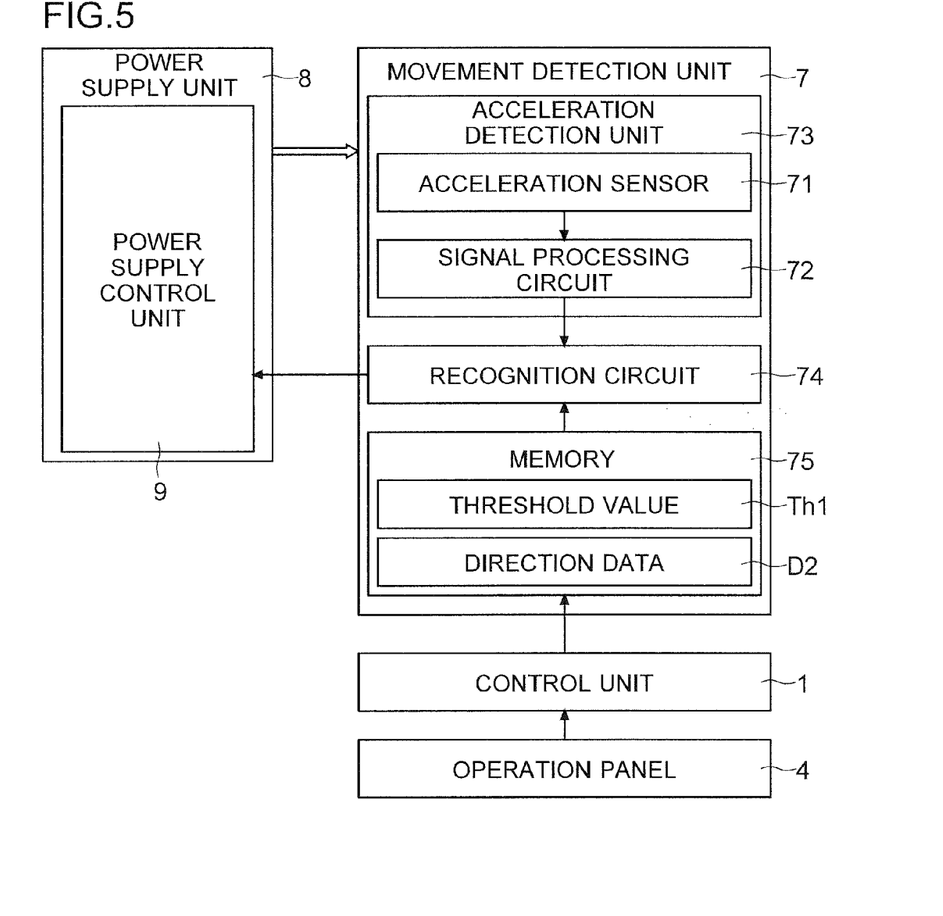
FIG. 5 is a diagram illustrating an example of a movement detection unit according to the embodiment.

Next, with reference to FIG. 5, a movement detection unit 7 according to the embodiment is described. The bottom surface of the multifunction peripheral 100 is provided with casters (caster wheels). The multifunction peripheral 100 can be moved by pushing. When the multifunction peripheral 100 is moved, the power cord C1 may be disconnected. For example, when the multifunction peripheral 100 is further moved after the power cord C1 is fully stretched, the power cord C1 is disconnected from the outlet or the multifunction peripheral 100. The main power supply should be turned off before moving the multifunction peripheral 100. However, in the sleep mode, the display panel 41 is turned off. There is no operation sound of a motor in the multifunction peripheral 100. The multifunction peripheral 100 appears not to be working at all at a glance. Therefore, a user may think that the multifunction peripheral 100 can be moved. In addition, a user may misunderstand that the main power supply is turned off.

In the sleep mode, reading or writing the storage unit 2 is not performed in a time period except for the temporary return period. In a time period except for the temporary return period, even if the power cord C1 is disconnected and power supply from the commercial power source 500 is cut off, breakdown of data or the storage unit 2 does not occur. On the other hand, during the temporary return, the storage unit 2 is being read or written. When the power cord C1 is disconnected so that power supply from the commercial power source 500 is cut off during the temporary return, data or the storage unit 2 may be broken down.

In order to prevent breakdown of data or the storage unit 2, the movement detection unit 7 is disposed in the multifunction peripheral 100. The movement detection unit 7 includes an acceleration sensor 71. The movement detection unit 7 detects movement of the multifunction peripheral 100 based on an output of the acceleration sensor 71. When the movement detection unit 7 detects movement of the multifunction peripheral 100 during the temporary return in which the storage unit 2 is read or written in the sleep mode, a warning is issued to users (details will be described later).

An acceleration detection unit 73 includes the acceleration sensor 71 (detection element) and a signal processing circuit 72. The signal processing circuit 72 processes an output of the acceleration sensor 71. The acceleration sensor 71 outputs a voltage corresponding to deformation (distortion) due to applied acceleration. Various elements can be used as the acceleration sensor 71. For example, a capacitance type, a piezoresistive type, or a gas temperature distribution type can be used as the detection element. A two or more axis sensor is used as the acceleration sensor 71 so that movement direction of the multifunction peripheral 100 can be detected. The signal processing circuit 72 outputs a voltage waveform in proportion to the acceleration and corresponding to the movement direction.

A recognition circuit 74 recognizes acceleration (magnitude) based on an output value of the acceleration detection unit 73. The recognition circuit 74 recognizes movement direction based on an output of the acceleration detection unit 73. The recognition circuit 74 compares a threshold value Th1 with the recognized acceleration. The threshold value Th1 is stored in a memory 75 in a nonvolatile manner. The threshold value Th1 is used for determining whether or not the multifunction peripheral 100 is moved. When the acceleration is larger than the threshold value Th1, the recognition circuit 74 supplies a movement information signal to the power supply control unit 9. The movement information signal is a signal informing that the multifunction peripheral 100 is moved. The power supply control unit 9 supplies power to the movement detection unit 7 even in the sleep mode. In this way, the movement of the multifunction peripheral 100 can be detected even in the sleep mode. The power supply control unit 9 can recognize movement of the multifunction peripheral 100.

Here, in the multifunction peripheral 100, the threshold value Th1 can be set. A user may want that even a slight movement of the multifunction peripheral 100 is detected so that the warning is issued. On the other hand, another user may want that the multifunction peripheral 100 does not issue warning against a small vibration due to contact with a human or an object. Therefore, the operation panel 4 receives setting of the threshold value Th1. The control unit 1 controls the memory 75 to store the threshold value Th1 set with the operation panel 4. The movement detection unit 7 determines whether or not the multifunction peripheral 100 is moved based on the threshold value Th1 set with the operation panel 4. In this way, a level of the movement of the multifunction peripheral 100 to be warned can be determined based on user's intention.

(Warning Against Movement of Multifunction Peripheral 100 in Sleep Mode)

Figure 6:
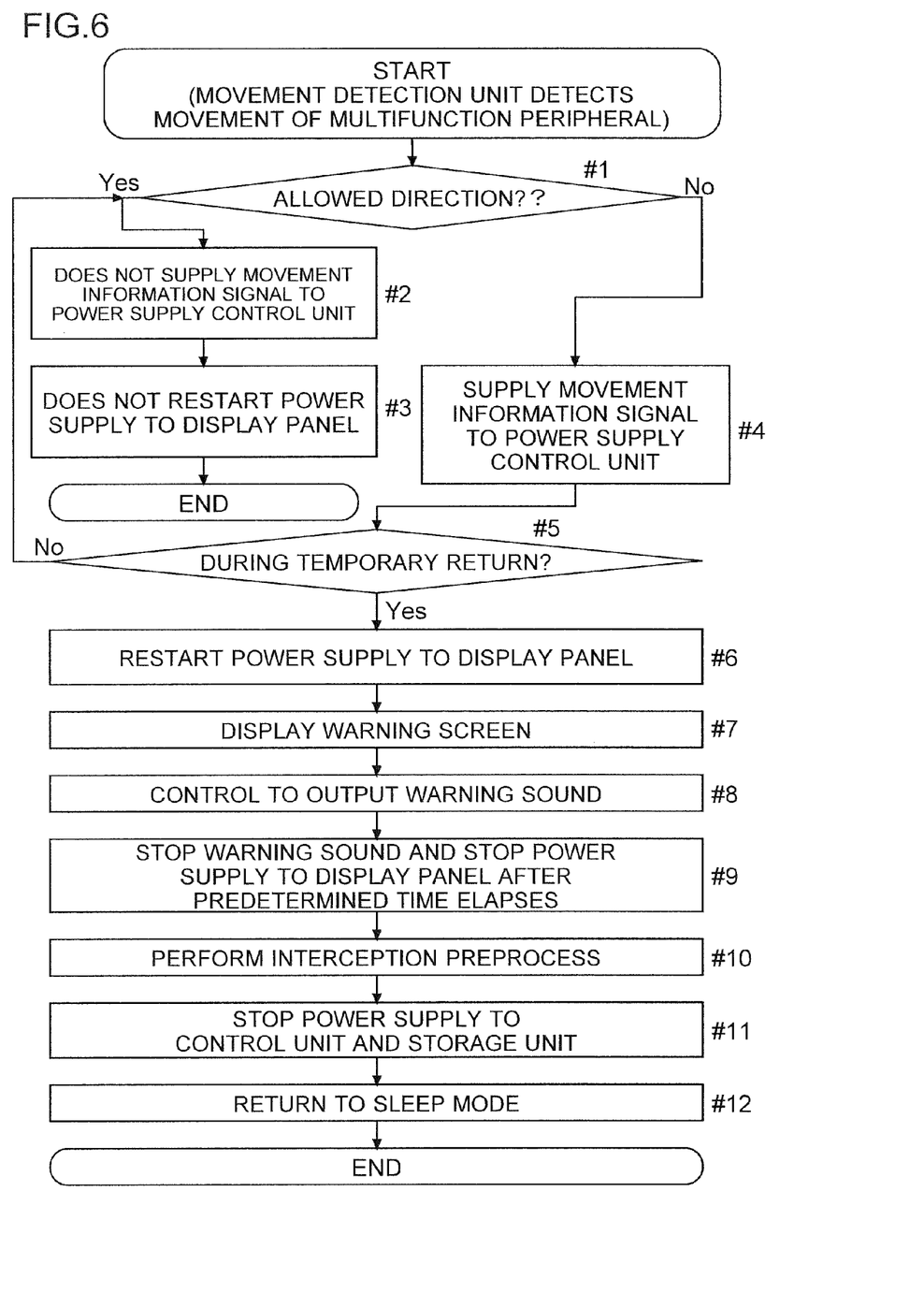
FIG. 6 is a flowchart illustrating an example of a flow of a process for warning against movement in a sleep mode of the multifunction peripheral according to the embodiment.

Next, with reference to FIG. 6, there is described an example of a flow of a warning process against movement in the sleep mode of the multifunction peripheral 100 according to the embodiment. The flow of FIG. 6 starts at a time point when the movement detection unit 7 detects movement of the multifunction peripheral 100 in the sleep mode of the multifunction peripheral 100. In other words, it is a time point when the movement detection unit 7 recognizes acceleration larger than the threshold value Th1 during the sleep mode. Note that the movement detection unit 7 continues to detect movement of the multifunction peripheral 100 after starting the sleep mode until returning to the normal mode, or until the main power supply of the multifunction peripheral 100 is turned off, First, the movement detection unit 7 (recognition circuit 74) checks whether or not movement direction of the multifunction peripheral 100 is an allowed direction (Step #1). The allowed direction is a predetermined movement direction in which the power cord C1 is hardly disconnected.

For example, the power cord C1 is attached to the rear side of the multifunction peripheral 100. When the multifunction peripheral 100 is moved frontward, the power cord C1 is stretched and is easily disconnected. On the contrary, when the multifunction peripheral 100 is moved rearward, the power cord C1 is not pulled and is hardly disconnected.

A certain angle range is set as the allowed direction in advance. It is supposed that the power cord C1 is attached to the rear side of the multifunction peripheral 100, the right direction of the multifunction peripheral 100 is set to zero degrees, the rear direction is set to 90 degrees, the left direction is set to 180 degrees, and the front direction is set to 270 degrees. Then, a range from 75 to 105 degrees can be set as the allowed direction, for example. The allowed direction includes the direction of one of sides of the multifunction peripheral, to which the power cord C1 is attached (rear direction). Direction data D2 indicating the allowed direction is stored in the movement detection unit 7 (see FIG. 5).

When the movement is in the allowed direction (Yes in Step #1), the movement detection unit 7 does not supply the movement information signal to the power supply control unit 9 (Step #2). Therefore, the power supply control unit 9 does not restart power supply to the display panel 41 (Step #3). Then, this flow is finished (END, the sleep mode is kept). When the movement of the multifunction peripheral 100 is in the allowed direction, warning to users is not performed.

On the other hand, the movement is not in the allowed direction (No in Step #1), the movement detection unit 7 supplies the movement information signal to the power supply control unit 9 (Step #4). When receiving the movement information signal (when the power supply control unit 9 recognizes movement of the multifunction peripheral 100), the power supply control unit 9 checks whether or not the multifunction peripheral 100 is during the temporary return (Step #5). When the multifunction peripheral 100 is not during the temporary return (when it is not in the temporary return period, No in Step #5), the power supply control unit 9 does not restart power supply to the display panel 41 (Step #3). Unnecessary warning is not made. Then, this flow is finished (END).

When the movement detection unit 7 detects movement of the multifunction peripheral 100 during the period from start to end of the temporary return (Yes in Step #5), the power supply control unit 9 restarts power supply to the display panel 41 (Step #6). During the temporary return, the control unit 1 is temporarily returned. Therefore, the control unit 1 controls the display panel 41 to display a warning screen (Step #7). Further, the control unit 1 controls the speaker 44 to output warning sound (Step #8).

The control unit 1 controls to display the warning screen (Step #7). The warning screen may include a message informing that the storage unit 2 may be being read or written. The warning screen may include a message informing that disconnection of the power cord C1 due to movement of the multifunction peripheral 100 may cause breakdown of data and the storage unit 2. The warning screen may include a message informing that it is necessary to prevent disconnection of the power. The warning screen may include a message informing that it is necessary to stop movement of the multifunction peripheral 100. The warning screen may include one or more messages described above. In addition, the control unit 1 controls the speaker 44 to output warning sound (Step #8). The warning sound is beep sound or siren sound, for example. In addition, the warning sound may be output repeatedly at a certain interval. In the sleep mode, the display panel 41 in an off state is turned on, and the warning sound is output, so as to urge a user to stop movement of the multifunction peripheral 100. As a result, disconnection of the power cord C1 can be prevented.

When a predetermined time period has elapsed from start of Step #7 or Step #8, the control unit 1 stops the output of the warning sound. In addition, the control unit 1 controls the power supply control unit 9 to stop power supply to the display panel 41 (Step #9). As a result, the warning sound and the warning display are finished. Further, after the specific process is finished, the control unit 1 controls the storage unit 2 to perform the interception preprocess (Step #10). Further, the control unit 1 controls the power supply control unit 9 to stop power supply to the control unit 1 and the storage unit 2 (Step #11). In this way, the multifunction peripheral 100 returns to the sleep mode (Step #12). Then, this flow is finished (END).

In this way, the image forming apparatus (multifunction peripheral 100) according to the embodiment includes the power supply unit 8, the power cord C1, the movement detection unit 7, the operation panel 4, the storage unit 2, the control unit 1, and the power supply control unit 9. The power supply unit 8 generates voltage based on power supplied from the commercial power source 500. The power cord C1 is inserted to the image forming apparatus. The power cord C1 connects the power supply unit 8 and the commercial power source 500. The movement detection unit 7 includes the acceleration detection unit 73 having the acceleration sensor 71. The movement detection unit 7 detects movement of the image forming apparatus based on an output of the acceleration sensor 71. The operation panel 4 includes the display panel 41. The storage unit 2 stores data. The control unit 1 controls the storage unit 2 to read data and to write data. When a predetermined transition condition is satisfied, the power supply control unit 9 stops power supply to the predetermined supply stop portions so that the image forming apparatus becomes the sleep mode. The supply stop portions include the display panel 41, the storage unit 2, and the control unit 1. When a predetermined return condition is satisfied in the sleep mode, the power supply control unit 9 restarts power supply to the supply stop portions so that the image forming apparatus becomes the normal mode. When a predetermined specific process is performed in the sleep mode, the power supply control unit 9 temporarily restarts power supply to the control unit 1 and the storage unit 2 for temporary return. The specific process is a process in which the storage unit 2 is read or written. After the specific process is performed, the power supply control unit 9 stops power supply to the control unit 1 and the storage unit 2 so that the temporary return is finished. The control unit 1 controls the storage unit 2 to perform the interception preprocess before the temporary return is finished. The interception preprocess is a process for protecting stored data. When the movement detection unit 7 detects movement in the period from start to end of the temporary return, the power supply control unit 9 restarts power supply to the display panel 41. In addition, the control unit 1 controls the display panel 41 to display warning informing that the storage unit 2 is working and urging to be careful so that the power is not disconnected.

In this way, it is possible to urge to be careful about disconnection of the power cord C1 at timing when breakdown of data or the storage unit 2 can be caused. In the sleep mode, the storage unit 2 may be being read or written. It may be during the temporary return. In this case, the image forming apparatus should not be moved. To avoid disconnection of power supply due to disconnection of the power cord C1, warning can be output. In addition, the display panel 41 that is turned off in the sleep mode is turned on for the warning. Therefore, it is possible to inform a user that the power of the image forming apparatus is turned on. Thus, it is possible to prevent movement of the image forming apparatus and disconnection of the power cord C1 during the temporary return. It is possible to prevent breakdown of data and the storage unit 2. In addition, it is possible to urge to turn off the power and to disconnect the power cord C1 before moving the image forming apparatus.

In addition, the image forming apparatus includes the speaker 44. When the movement detection unit 7 detects movement in the period from start to end of the temporary return in the sleep mode, the control unit 1 controls the speaker 44 to output warning sound. In this way, it is possible to inform a user that the image forming apparatus is being moved at inappropriate timing. It is possible to output warning against movement of the image forming apparatus during the temporary return. It is possible to inform a user that the image forming apparatus should not be moved. As a result, the image forming apparatus is not moved to such extent that the power cord C1 is disconnected during the temporary return. It is possible to prevent breakdown of data or the storage unit 2.

In addition, when the movement detection unit 7 detects movement in a time period except for the temporary return period in the sleep mode, the power supply control unit 9 does not restart power supply to the display panel 41. In the time period except for the temporary return period, the storage unit 2 is not being read or written. Even if the power cord C1 is disconnected, breakdown of data or the storage unit 2 does not occur. Therefore, the movement is in the time period except for the temporary return period, power supply to the display panel 41 is not restarted. The warning screen is not displayed. Therefore it is possible to avoid unnecessary turning on of the display panel 41 in the sleep mode.

In addition, the movement detection unit 7 recognizes movement direction of the image forming apparatus. When movement in the allowed direction is detected in the sleep mode, the power supply control unit 9 does not restart power supply to the display panel 41. The allowed direction is a predetermined direction in which the power cord C1 is hardly disconnected. In this way, when the movement is in a direction in which the power cord C1 is hardly disconnected (movement direction without a problem), it is possible not to display the warning screen. Therefore it is possible to avoid unnecessary turning on of the display panel 41 in the sleep mode.

In addition, the operation panel 4 receives setting of the threshold value Th1. The threshold value Th1 is used for the movement detection unit 7 to determine whether or not movement has occurred. The threshold value Th1 is compared with an output value of the acceleration detection unit 73. The movement detection unit 7 determines whether or not movement has occurred based on the threshold value Th1 set with the operation panel 4. In this way, sensitivity to the movement can be set in accordance with user's desire.

In addition, the image forming apparatus according to the embodiment includes the communication unit 6 connected to the network 400. The specific process is a process concerning response to a request from the network 400. In this way, in order to respond to a request from the network 400, the control unit 1 and the storage unit 2 are temporarily returned for a necessary period of time. Therefore it is possible to reduce average power consumption of the image forming apparatus in the sleep mode.

Although the embodiment of the present disclosure is described above, the scope of the present disclosure is not limited to this, and it is possible to add various modifications for implementation within the scope of the disclosure without deviating from the spirit thereof.

What is claimed is:

1. An image forming apparatus comprising:
a power supply unit for generating a voltage based on a power supplied from a commercial power source;
a power cord inserted to the image forming apparatus so as to connect the power supply unit and the commercial power source;
a movement detection unit including an acceleration detection unit having an acceleration sensor, so as to detect movement of the image forming apparatus based on an output of the acceleration sensor;
an operation panel including a display panel;
a storage unit for storing data;
a control unit for controlling the storage unit to read data and to write data; and
a power supply control unit for stopping power supply to predetermined supply stop portions so that the image forming apparatus becomes a sleep mode when a predetermined transition condition is satisfied, while restarting power supply to the supply stop portions so that the image forming apparatus becomes a normal mode when a predetermined return condition is satisfied in the sleep mode, wherein
the supply stop portions include the display panel, the storage unit, and the control unit,
in the sleep mode, the power supply control unit temporarily restarts power supply to the control unit and the storage unit for temporary return when the control unit performs a predetermined specific process, and stops power supply to the control unit and the storage unit so as to finish the temporary return after the specific process is performed, the specific process being accompanied with reading or writing the storage unit,
the control unit controls the storage unit to perform the interception preprocess for protecting the stored data before the temporary return is finished, and
when the movement detection unit detects movement in a period from start to end of the temporary return, the power supply control unit restarts power supply to the display panel, and the control unit controls the display panel to display warning informing that the storage unit is working and urging to be careful so that the power is not disconnected.

2. The image forming apparatus according to claim 1, further comprising a speaker, wherein when the movement detection unit detects movement in the period from start to end of the temporary return in the sleep mode, the control unit controls the speaker to output warning sound.

3. The image forming apparatus according to claim 1, wherein when the movement detection unit detects movement in a period other than the temporary return period in the sleep mode, the power supply control unit does not restart power supply to the display panel.

4. The image forming apparatus according to claim 1, wherein
the movement detection unit recognizes movement direction, and
when movement in a predetermined allowed direction in which the power cord is hardly disconnected is detected in the sleep mode, the power supply control unit does not restart power supply to the display panel.

5. The image forming apparatus according to claim 4, wherein
the allowed direction includes a direction of one of sides of the image forming apparatus, to which the power cord is attached, and
direction data indicating the allowed direction is stored in the movement detection unit.

6. The image forming apparatus according to claim 1, wherein
the operation panel receives setting of a threshold value,
the threshold value is used for the movement detection unit to determine whether or not movement has occurred and is compared with an output value of the acceleration detection unit, and
the movement detection unit determines whether or not movement has occurred based on the threshold value set with the operation panel.

7. The image forming apparatus according to claim 1, further comprising a communication unit connected to a network, wherein the specific process is a process concerning response to a request from the network.

8. A method for controlling an image forming apparatus, comprising:
generating a voltage based on a power supplied from a commercial power source;
connecting the image forming apparatus and the commercial power source with a power cord;
detecting movement of the image forming apparatus;
providing a storage unit for storing data to the image forming apparatus;
stopping power supply to predetermined supply stop portions so that the image forming apparatus becomes a sleep mode when a predetermined transition condition is satisfied;
restarting power supply to the supply stop portions so that the image forming apparatus becomes a normal mode when a predetermined return condition is satisfied in the sleep mode;
including a display panel and the storage unit in the supply stop portions;
in the sleep mode, temporarily restarting power supply to the storage unit for temporary return when performing a predetermined specific process, and stopping power supply to the storage unit so as to finish the temporary return after the specific process is performed, the specific process being accompanied with reading or writing the storage unit;
controlling the storage unit to perform the interception preprocess for protecting the stored data before the temporary return is finished; and
when detecting movement of the image forming apparatus in a period from start to end of the temporary return, restarting power supply to the display panel, and controlling the display panel to display warning informing that the storage unit is working and urging to be careful so that the power is not disconnected.

* * * * *